Sept. 9, 1947. L. E. HARDING 2,427,210
ANIMATED FIGURE
Filed Sept. 22, 1944

INVENTOR
LLOYD E. HARDING
BY William A. Zalesak
ATTORNEY

Patented Sept. 9, 1947

2,427,210

UNITED STATES PATENT OFFICE 2,427,210

ANIMATED FIGURE

Lloyd E. Harding, Bradley Beach, N. J., assignor of one-fifth to Edmund J. Lada, Woodhaven, N. Y., and one-fifth to William A. Zalesak, Union, N. J.

Application September 22, 1944, Serial No. 555,236

6 Claims. (Cl. 46—45)

My invention relates to an animated toy and specifically to a doll.

An object of my invention is to provide an animated figure having a movable element or elements which may be caused to move by the approach of another element.

More specifically it is an object of my invention to provide an animated figure having an eye member or members which can be made to move upon the approach of another object.

More specifically it is an object of my invention to provide an animated figure having a movable eye member which can be made to follow the movement of an object upon its approach or to be repelled by the approach of the object.

A further object of my invention is to provide an animated figure having a movable head member which can be made to follow the movement of an object upon its approach or be repelled by the approach of the object.

Broadly the figure which may be that of a doll is provided with movable eye members mounted in a movable head member. Associated with the doll is a free element which may, for example, be a plaque and have a mirror on one side and other material such as questions or written matter on the other. When the side having the mirror is placed before the eyes of the doll and moved about the eyes will follow the mirror. However, if the plaque is reversed the eyes will be repelled. By proper design the reverse may take place. Stops are provided for the eye member so that the head is caused to move if the free element is moved beyond certain limits.

The movement of the eyes upon approach of the plaque is accomplished by mounting upon the eye member or eye piece a magnet having unlike poles. Mounted within the plaque is also a magnet having unlike poles. When like poles of the eye member and plaque are matched upon approach of the plaque to the eye member, the movable eye member is repelled so that the eyes look away from the surface being presented. When the plaque is reversed end for end by rotating the mirror the eye member will be attracted since unlike poles are matched and will follow the movements of the plaque. The design may be such that the eyes will follow one side and be repelled when the other side is presented. If desired the magnet in the head on the eye piece can be fixed to the head so that the entire head follows the plaque in its movements without movement of the eyes.

Figure 1:
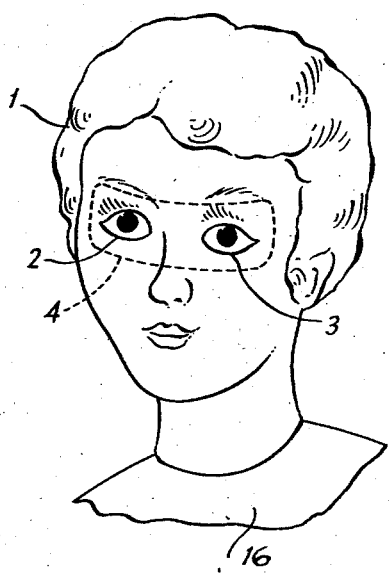
Figure 2:
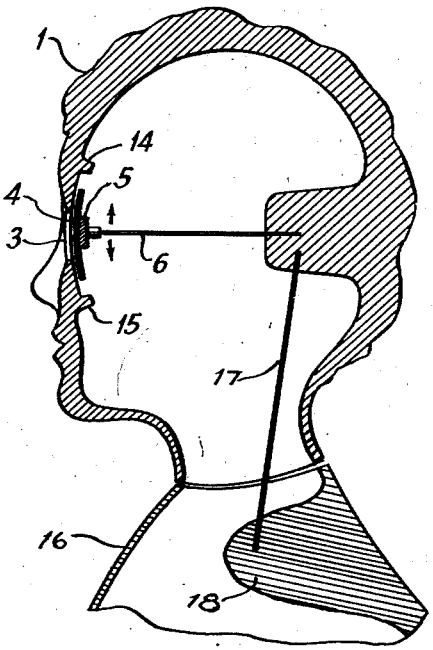
Figure 3:
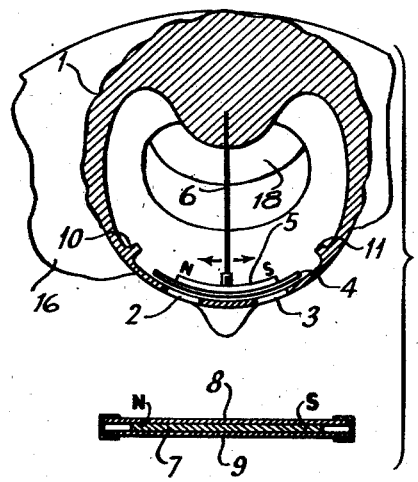
Figure 4:
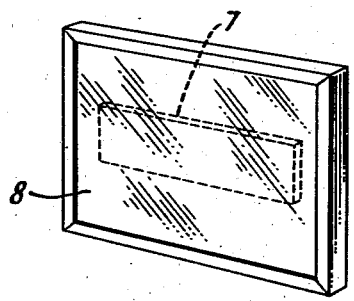

The novel features which I believe to be characteristic of my invention are set forth with particularity in the appended claims, but the invention itself will best be understood by reference to the following description taken in connection with the accompanying drawing in which Figure 1 is a perspective of the head of an animated figure embodying my invention, Figure 2 is a longitudinal section through Figure 1 showing details of construction, Figure 3 is a transverse section of Figure 2 with the associated free element illustrating the principles of my invention, and Figure 4 shows the details of one of the free elements of Figure 3 and in perspective.

In the preferred embodiment of my invention which is illustrated but which is not necessarily limited to a doll, there is disclosed a doll's head 1 having apertures 2 and 3 for the eyes with a movable eye piece member 4 positioned therebehind with eyes simulated thereon. This member is supported by means of a flexible element 6 secured within the head member and having extending transversely thereof a magnet 5 having oppositely disposed poles. This eye member may move up and down and from side to side, the movements being limited by the stop elements 14—15 and 10—11 as shown in Figures 2 and 3. Normally the eyes are maintained in more or less central position as indicated in Figure 1.

In order to cause movement of the eyes, a free object in the form of a plaque as shown in the lower part of Figure 3 and in Figure 4 is provided. It may have various shapes but is shown as of rectangular shape. It has oppositely disposed surfaces 8 and 9 between which is secured a magnet 7 having oppositely disposed poles. One surface or side of this plaque may comprise a mirror such as shown as 8 and the other side may have reading material thereon in the form of questions, for example, or mathematical problems or the like. These are only two examples of the many other surfaces that could be utilized.

If the plaque is presented to the movable eye piece, such that the poles are matched upon approach of the plaque, the eye piece will move up or down or to the side depending upon the movement of the plaque so that the eyes will be diverted away from the surfaces presented. On the other hand, if the plaque is rotated on a vertical axis through 180° unlike poles will be matched and the eyes will follow the plaque as it is rotated and moved from side to side or up and down.

In addition to the support for the eye member which permits movement of the eye member, the head may be mounted on the body to also permit movement of the head as a whole. As best shown in Figures 2 and 3 a flexible element 17 in the form, for example, of a thin steel strip 17 movably supports the head on the body member 16, the end of the element 17 being fixed in the projection 18 within the body member. The element 17 may be of stiffer material than that of element 16 so that the eye member will be moved first to any of its limits. If the free element is then moved beyond the limits of movement of the eye member, the head as a whole will be moved on its support. The magnet 5 could be fixed in the head 6 so that the eyes would not move and the head would turn as a whole upon approach of the plaque.

In one example the eyes may be made to follow the mirror indicating self-satisfaction and when the opposite side is presented with questions or reading matter the eyes will be diverted, indicating no desire to use the mind. The arrangement could be reversed so that the animated figure could be represented as the studious type or as the vain type.

While the device is shown as utilized with a doll it is obvious that it could be used in other ways, for example, in the form of animals and the plaque could be made up to represent other objects.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. An animated figure having a body, a first movable element mounted on said body, a second movable element supported by said first movable element and carrying a magnet with unlike poles, and a free element for causing movement of said movable elements upon approach of the free element, said free element containing a magnet having unlike poles whereby when like poles of the second movable element and said free element are brought opposite one another the movable elements will be repelled and when unlike poles are brought opposite one another the elements will be attracted when the elements approach each other, the second movable member being more freely movable than the first movable member whereby movement of the second movable member will occur before movement of the first movable member.

2. An animated figure having a hollow head portion provided with apertures representing eyes, a movable member having eye elements portrayed thereon mounted within said head portion with the eye elements supported in registry with said apertures, a flexible support upon which said movable member is mounted, said flexible support extending tranversely of said hollow head portion and being fixed to the opposite side of said head portion from said apertures, said movable member having a magnet supported thereon and having unlike poles, a free member and a magnet carried by said free member and having unlike poles whereby when like poles of the members are brought opposite one another said movable member will be repelled and when unlike poles are brought opposite one another the movable member will be attracted when the members approach each other, said flexible support permitting movement of said eye member in any direction about the point of attachment of said flexible support to said hollow head portion.

3. An animated figure having a hollow head portion provided with apertures representing eyes, a movable member having eye elements portrayed thereon mounted within said head portion with the eye elements supported in registry with said apertures, a flexible support upon which said movable member is mounted, said flexible support extending transversely of said hollow head portion and being fixed to the opposite side of said head portion from said apertures, said movable member having a magnet supported thereon and having unlike poles, a free member and a magnet carried by said free member and having unlike poles whereby when like poles of the members are brought opposite one another said movable member will be repelled and when unlike poles are brought opposite one another the movable member will be attracted when the members approach each other, said flexible support permitting movement of said eye member in any direction about the point of attachment of said flexible support to said hollow head portion, a body portion, and a second flexible support extending within said hollow head member and secured to said body portion for permitting rotation of said hollow head member in any direction.

4. An animated figure having a hollow head member, a body member, a flexible support for said head member fastened to said body member and extending within said head member, said flexible support permitting movement of said head member in any direction, said head member having a portion provided with apertures representing eyes, a movable eye member having eye elements portrayed thereon within the hollow head member with the eye members in registry with the apertures, said movable eye member having a magnet supported thereon and extending lengthwise thereof and having unlike poles, a flexible support for said movable eye member, said flexible support extending transversely of said hollow head member and being secured to said hollow head member opposite to the apertures in said head member, and stops adjacent said apertures for limiting movement of said movable member, a free member and a magnet carried within said free member and having unlike poles whereby when like poles of the free member and said movable eye member are brought opposite one another said movable eye member will be repelled and when unlike poles are brought opposite one another said movable eye member will be attracted when said members approach each other, said flexible support extending within said head member from said body member extending transversely of the flexible support for said movable eye member.

5. An animated figure having a hollow head member, said head member having a portion provided with apertures representing eyes, a movable eye member having eye elements portrayed thereon within the hollow head member with the eye members in registry with the apertures, said movable eye member having a magnet supported thereon and extending lengthwise thereof and having unlike poles, a flexible support for said movable eye member, said flexible support extending transversely of said hollow head member and being secured to said hollow head member opposite to the apertures in said head member, and stops adjacent said apertures for limiting movement of said movable member, a free member and a magnet carried within said free member and having unlike poles whereby when like poles of the free member and said movable eye member are brought opposite one another said movable eye member will be repelled and when unlike poles are brought opposite one another said movable eye member will be attracted when said members approach each other.

6. An animated figure having a hollow head portion provided with apertures representing eyes, a movable member having eye elements portrayed thereon mounted within said head portion with the eye elements supported in registry with said apertures, a flexible support upon which said movable member is mounted, one end of said flexible support being secured to said movable member and the other end of said flexible support being connected to a point within said head portion, said movable member having a magnet supported thereon and having unlike poles, a free member and a magnet carried by said free member and having unlike poles whereby when like poles of the members are brought opposite one another said movable member will be repelled and when unlike poles are brought opposite one another said movable member will be attracted when said members approach each other, said flexible support permitting movement of said eye member in any direction about the point of attachment of said flexible support to said hollow head portion.

LLOYD E. HARDING.

REFERENCES CITED

The following references are of record in the file of this patent:

UNITED STATES PATENTS

| Number | Name | Date |
| --- | --- | --- |
| 1,138,737 | Dunham | May 11, 1915 |
| 720,703 | Krampe | Feb. 17, 1903 |
| 2,277,672 | Stone | Mar. 31, 1942 |

FOREIGN PATENTS

| Number | Country | Date |
| --- | --- | --- |
| 486,637 | Germany | May 27, 1928 |
| 758,125 | France | Jan. 11, 1934 |